Patented Jan. 7, 1936

2,027,000

UNITED STATES PATENT OFFICE 2,027,000

PROCESS OF REACTING ALKALI METALS WITH AROMATIC HYDROCARBONS

Norman D. Scott, Niagara Falls, N. Y., assignor to E. I. du Pont de Nemours & Company, Inc., Wilmington, Del., a corporation of Delaware No Drawing. Application October 19, 1932,
Serial No. 638,524

14 Claims. (Cl. 660—108)

This invention relates to improvements in the method of effecting the reaction of alkali metals with aromatic hydrocarbons.

It is well known that alkali metals will react with a wide variety of aromatic hydrocarbons under a wide variety of conditions. An extensive review of this work has recently been published by C. B. Wooster, (Chemical Reviews XI 1 Aug. 1932). While most of the reactions described are at present of little technical significance on account of the cost of the materials involved, there is particular interest in the attempts that have been made to react alkali metals with the cheaper hydrocarbons such as naphthalene and diphenyl. Schlenk (Annalen 463 90–95) carried out slow reactions using lithium in ethyl ether and obtained sufficient reaction in eight days with naphthalene, and in fourteen days with diphenyl, to permit some examination of the products formed. He represented the alkali metal compounds by the formulæ,

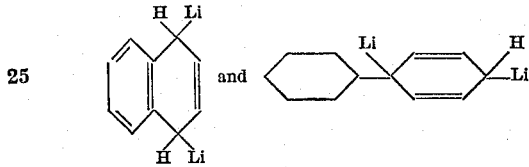

Schlenk, using ethyl ether as solvent, failed to get any appreciable reaction of sodium with these hydrocarbons even in months. He attributed this to a poisoning effect on the sodium of minute traces of sulfur compounds present even in the best grades of naphthalene as supplied for a standard for calorimetry.

The reaction of sodium with naphthalene has also been studied to some extent using liquid ammonia as solvent. At ordinary temperatures, the reaction products are sodamide and tetralin. At low temperatures a red solution is obtained which has been shown by Wooster, (J. A. C. S. 53 179–187 1931), to be in all probability a monosodium tetralin formed by addition of four atoms of sodium to one molecule of naphthalene, followed by immediate ammonolysis of three atoms of the sodium to sodamide as represented by the equations:

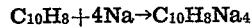
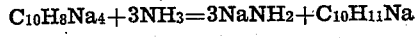

Because of the large consumption of sodium and the reactivity of the ammonia used as solvent, this method is practically useless as a means of preparing acids or other derivatives from naphthalene.

One object of this invention is to improve the rate of known reactions of alkali metals with various classes of aromatic hydrocarbons. Another object is to cause the reactions to be carried out at low or moderate temperatures and conditions favorable to the stability of the products. Another object is to permit the reaction of relatively cheap and available materials to give valuable products not previously obtainable. Other objects will appear from the description of the invention.

I have found that certain solvents and classes of solvents have a very specific action in promoting the reaction of alkali metals with aromatic hydrocarbons such as naphthalene, diphenyl, phenanthrene or anthracene and others which will form addition products with alkali metals. As stated, the action of these solvents is specific, but I do not know whether their action is catalytic, whether the solvent itself takes part in the reaction in some manner, or whether there are some solubility or other physical factors involved. These solvents permit or enhance the reaction of sodium with aromatic hydrocarbons, which reactions either go exceedingly slow in other solutions or do not got at all. These solvents which I have found of such remarkable activity and usefulness for sodium reactions are broadly in the class of ethers although all of the ethers are not effective, and of the effective ones, some are better than others. Thus I have used satisfactorily aliphatic mono-ethers such as the following: dimethyl ether, methyl ethyl ether, methyl normal propyl ether, methyl isopropyl and mixtures of these with other solvents; aliphatic di-ethers such as methylal, glycol dimethyl ether, and the cyclic ethers glycol formal and dioxan; other poly-ethers such as: glycerol trimethyl ether, dimethylene pentaerythrite, glycerol mono-formal methyl ether and the like. I have also tried other ethers which would not permit this reaction to proceed or in which the reactions are exceedingly slow, and which did not have the specific effective action of those above mentioned, for example, diethyl ether, methyl normal butyl ether, di-isopropyl ether, methyl phenyl ether, methyl benzyl ether. These last mentioned ethers are without effect in the reaction between sodium and naphthalene, although as noted there is slight reaction between lithium and naphthalene in diethyl ether, and there is reaction between sodium and anthracene in diethyl ether. These ethers, however, are outside of the scope of my invention since they do not have the specific accelerating action of my "effective" or "active" ethers.

In general the mono ethers which were effective in promoting the reaction of sodium with the hydrocarbons, with the exception of the cyclic ethers, may be characterized as aliphatic ethers containing a $CH_3$—O group and which have an oxygen-carbon ratio of not less than 1:4.

Within the restrictions above given as to the limitations of the ethers applicable to effect these reactions these ethers must furthermore not be split by the alkali metals or the alkali metal addition compounds under the conditions used. I do not mean by this that the ethers may not react in some way in some reversible reaction with the alkali metal and/or hydrocarbon since indications are that the ethers in effecting the reaction of the sodium with the aromatic hydrocarbon do to some extent take part in the reaction, but the ether must not be broken up or form irreversible reaction products. Thus, for example, ethylene oxide may be considered an ether as falling within the limitations given except for the fact that it reacts with sodium naphthalene and hence cannot satisfactorily perform the function required. So also, for example, benzyl methyl ether is split by sodium and cannot be used. In order to simplify the wording later I specify such ethers as are effective within my invention as being inert, although as noted they may play some reactive role in causing the reactions to proceed.

I have found that these effective ethers would permit the reaction with the alkali metals, sodium potassium and lithium with approximately equal ease.

I have found that inert non-ether types of solvents such as hydrocarbons or alkyl sulfides which do not react with sodium and which in themselves are non-effective for the reactions may be used as diluting agents for the effective ethers. There is, however, a minimum concentration of the effective ether in the non-effective solvents beyond which the reaction will not proceed. Thus, in general the effective dimethyl ether can be diluted with a non-reactive hydrocarbon up to 4 or 5 times its volume. If the dilution be as high as 6 times the volume of the dimethyl ether the reaction will not proceed. With the higher ethers, which are non-effective or relatively non-effective, in themselves, the dilution may be greater. Thus diethyl ether, which is not effective for most the reactions, can be used in amounts up to ten times the volume of dimethyl ether and the reaction of sodium and naphthalene will still proceed.

As noted above, various aromatic hydrocarbons have been tried, and it was found that these effective ethers enhanced the alkali metal reactions. For further description, the invention will be illustrated particularly with respect to the reaction of naphthalene with sodium, but it is to be understood that what is said thereon will apply equally well to the reaction of the other alkali metals and to any of the aromatic hydrocarbons capable of forming addition compounds with alkali metal.

I have found that sodium reacts very readily with naphthalene or diphenyl in dimethyl ether solution even at $-24°$ C. Naphthalene also reacts readily with sodium using methyl-ethyl-ether as solvent. Other mixed mono-ethers with one methyl and one higher primary alkyl group can also be used. The ease with which the reaction starts and the solubility of the addition compounds decreases, however, with increasing weight of the alkyl group. With mixed methyl ethers of butyl or higher alkyls it is usually preferable to add a small amount of a lighter more active methyl ether to start the reaction, as the reaction appears to be very definitely autocatalytic when once started.

This list of effective solvents includes compounds of a wide range of boiling points and other properties. It is obvious that it could be extended by anyone familiar with the art, without departing from the spirit of this invention, which involves the choice of an ether solvent with a high ratio of atoms of ether oxygen and with minimum substitution of H atoms by alkyl groups on the carbon atoms adjacent to the ether oxygen atoms.

It is to be understood also that this invention includes the use as solvent, not only of the "effective" solvents as defined and illustrated, but also of mixtures of these solvents with other solvents which may include the less active ethers, and also hydrocarbons. The amount of such dilution permissible will vary with the particular substances employed as will appear in the examples given below. Considerably greater dilution with inert solvents is permissible when the reaction is definitely started.

This reaction with naphthalene I have found occurs to put two atoms of sodium into each naphthalene molecule, thus giving a soluble addition product. Whether or not this soluble addition product also includes dimethyl ether I do not know, and I do not wish to be limited in any respect in this invention as to the addition mechanism taking place. If this addition product, still in the dimethyl solution be treated with $CO_2$, it is converted into the sodium salts of dihydronaphthalene dicarboxylic acids, which can be isolated.

In carrying out these reactions, I have found it to be of importance to have the surfaces of the sodium clean. Thus the solvent must be purified of such materials as will react with sodium and tend to form insoluble coatings thereon, under the conditions to be used, and the sodium should be protected from contact with such reactive materials from the time it is mechanically subdivided. Extreme fineness of sodium is not required although the rate will be dependent, among other things, on the extent of sodium surface, and this affords one means of controlling the rate. The naphthalene need not be of extreme purity. Technical flake naphthalene works quite satisfactorily. The complete absence of all sulfur compounds is not essential as shown by the fact that dimethyl sulfide can be used as an inert diluent solvent in the effective reaction medium for the reaction of sodium with naphthalene. The presence of free $CO_2$ dissolved in the solvent is likely to interfere with the reaction of sodium with naphthalene starting because of coating the sodium surface. On the other hand, when the reaction is well started, dry $CO_2$ can then be introduced and the carboxylation carried on simultaneously as long as care is taken that the rate is insufficient to destroy completely all the green color of the sodium naphthalene compound, which will continue to be formed by the reaction of additional sodium. In this way the whole preparation of the sodium salts of the dicarboxy acids can be carried out simultaneously in a single vessel. In order to insure complete freedom from metallic sodium in the product, however, it is better to filter the green solution of the sodium naphthalene away from unreacted sodium and treat it with $CO_2$ in a separate vessel. This precipitates the sodium salts which can be filtered out and the solvent, together with unreacted naphthalene and a small amount of the sodium naphthalene compound returned to the first vessel. Such a process can be operated either as a batch process or continuously.

The concentration of naphthalene that can be used is limited only by its solubility. The reaction temperature can vary from at least $-80°$ C. to above the melting point of sodium, limited only by the stability of the combination of materials used and that of the product. The reactions in general are fast up to about saturation of the solvent with the compound being made. A high rate can be maintained either by using enough solvent to dissolve all the product or by removing the product by a precipitation reaction as described above in the case of the formation of salts by treatment with $CO_2$. In these reactions, both the prior reaction with sodium and in the carboxylation, obviously pressures above atmospheric may be used if desired or necessary to confine the solvents at the temperatures found most optimum for the reaction.

The following examples are given by way of further illustration:

Example I 400 c. c. of liquid dimethyl ether were placed in a flask and maintained at or just below its boiling point at atmospheric pressure. To this was added 30.5 gms. of flake naphthalene and then 11.3 gms. of clean, finely divided sodium. The reaction commenced immediately on adding the sodium, as was evidenced by the solution turning an intensely green color. This solution was agitated continuously for about fifteen minutes and then a slow stream of $CO_2$ was introduced; this stream of $CO_2$ was maintained at such rate that the green color of the solution was not completely discharged until the sodium had essentially all dissolved or reacted. Toward the end of two hours the carboxylation was allowed to go to completion, giving a white slurry of sodium salts of dihydronaphthalene dicarboxylic acids. By treating the salts with aqueous HCl and repeated extraction with ether, a total yield of 87% of theory of a mixture of the isomeric dibasic acids was isolated. The reactions are presumed to be essentially quantitative, although a portion of the acid is difficult to extract from water.

Example II

The reaction of 2 gms. potassium with 6 gms. naphthalene was carried out in 400 c. c. methyl ether at $-25°$ C. The reaction occurred at about the same rate as sodium, but there was evidence of a side reaction probably involving impurities in the methyl ether. This resulted in the formation of a white precipitate even before $CO_2$ was introduced, and a corresponding decrease in the yield of dicarboxylic acids obtained.

Example III 1.8 gms. lithium and 24 gms. diphenyl were added to 200 c. c. methyl ether. Reaction started immediately and the mixture was given a $CO_2$ treatment as in Example I, the reaction being practically completed in an hour. An 80% yield was isolated of a mixture of acids having a molecular and equivalent weight corresponding to dihydrodiphenyl dicarboxylic acids.

Example IV

A small amount of finely divided sodium, and of naphthalene were placed in a test tube filled with nitrogen and a few cubic centimeters of purified methyl isopropyl ether distilled in. There was no immediate formation of colored compounds, but on standing overnight there was definite formation of a yellowish green material partly dissolved. The greenish color was intensified by warming to the boiling point.

Example V 76 c.c. of methyl normal butyl ether containing 39 gms. naphthalene and 11.5 gms. sodium failed to show evidence of reaction at temperatures from $-30°$ C. to the boiling point. By adding 23 c. c. of methyl ether, keeping the mixture cool enough to absorb this amount at atmospheric pressure, the reaction started readily, but the product appeared to be less soluble than in pure methyl ether.

Example VI 11.5 gms. sodium and 39 gms. naphthalene were added to 100 c. c. of methyl ethyl ether. Reaction began at once. After treatment with $CO_2$, a gross yield of 63% of the theoretical amount of dihydronaphthalene dicarboxylic acids was isolated from the sodium salts. The remainder represented mainly unreacted naphthalene and sodium.

Example VII 38.5 gms. diphenyl and 12 gms. sodium were added to 500 c. c. of dimethyl ether at $-25°$ C. Reaction began at once as evidenced by the formation of a blue green soluble disodium diphenyl addition compound. This was treated with $CO_2$ as in Example I, excess $CO_2$ being added at the end of 3 hours. The gross yield of dicarboxy acids isolated was 20% of theory, indicating a somewhat slower reaction, or lower solubility of the addition compound than in the case of sodium and naphthalene.

Example VIII 17.8 gms. of anthracene and 4.6 gms. sodium were added to 50 c. c. of dimethyl ether. The reaction was almost violent. $CO_2$ was introduced after the vigorous reaction had ceased. A gross yield of 61% of dihydroanthracene dicarboxy acids was isolated.

Example IX 50 gms. phenanthrene and 11.5 gms. sodium were added to 400 c. c. dimethyl ether at $-25°$ C. Reaction began at once, giving a deep blue solution. Treatment with $CO_2$ was begun after fifteen minutes' agitation, and excess $CO_2$ added after 2½ hours. The gross yield of dihydrophenanthrene dicarboxy acids isolated was 55% of the theoretical amount.

Example X 11.3 gms. sodium and 32 gms. of naphthalene were added to 250 c. c. anisole. Reaction would not start even when fresh sodium surfaces were formed in the reaction mixture, or the temperature varied from room temperature to $-35°$ C. The addition of 100 c. c. of methyl ether failed to induce reaction; reaction did occur with a total of 150 c. c. methyl ether present.

Example XI 5.8 gms. of sodium and 19 gms. of naphthalene were added to 100 c. c. of xylene. No colored compounds formed at room temperature or down to −35° C. Methyl ether was added in small increments. No color formed after 18 c. c. had been added, but did form with a total of 23 c. c. of dimethyl ether. Treatment with $CO_2$ after 3½ hours gave sodium salts from which were isolated 1.7 gms. of organic acids. The colored sodium compound did not appear to be very soluble in this solvent.

I claim:

1. Method of effecting the addition of an alkali metal to an aromatic hydrocarbon which will form addition compounds therewith which comprises bringing the alkali metal and the hydrocarbon together in a reaction medium comprising effective amounts of an ether inert to the alkali metal and the hydrocarbon-alkali metal compound under the conditions of the reaction, said ether having an oxygen to carbon ratio of not less than 1:4 and in which there is a $CH_3$—O— group if the ether is aliphatic and having no aryl group attached to the ether oxygen atom if the ether is a mono-ether.

2. A method of effecting the addition of an alkali metal to an aromatic hydrocarbon which will form addition compounds therewith which comprises reacting the alkali metal and the aromatic hydrocarbon in a reaction medium comprising effective amounts of an aliphatic ether having a $CH_3O$ group and an oxygen to carbon ratio of not less than 1:4, which is inert to the alkali metal and the hydrocarbon-alkali metal compound under the conditions of the reaction.

3. Method of effecting the addition of an alkali metal to an aromatic hydrocarbon which will form addition compounds therewith which comprises bringing the alkali metal and the aromatic hydrocarbon together in a reaction medium comprising effective amounts of a cyclic ether inert to alkali metal and the hydrocarbon-alkali metal compound under the conditions of the reaction.

4. A method of effecting the addition of an alkali metal to an aromatic hydrocarbon which will form addition products therewith which comprises reacting the alkali metal and the hydrocarbon in a reaction medium comprising effective amounts of a methyl alkyl ether in which the alkyl group contains 1 to 3 carbon atoms.

5. Method of effecting the addition of an alkali metal to an aromatic hydrocarbon which will form addition compounds therewith which comprises bringing the alkali metal and the aromatic hydrocarbon together in a reaction medium comprising effective amounts of dimethyl ether.

6. Method of effecting the addition of an alkali metal to naphthalene which comprises bringing the alkali metal and the naphthalene together in a reaction medium comprising effective amounts of a mono-ether inert to the alkali metal and the naphthalene-alkali metal compound under the conditions of the reaction, said ether having an oxygen to carbon ratio of not less than 1:4 and in which there is a $CH_3$—O— group if the ether is aliphatic and having no aryl group attached to the ether oxygen atom.

7. Method of effecting the addition of an alkali metal to diphenyl which comprises bringing the alkali metal and the diphenyl together in a reaction medium comprising effective amounts of a mono-ether inert to the alkali metal and the diphenyl-alkali metal compound under the conditions of the reaction, said ether having an oxygen to carbon ratio of not less than 1:4 and in which there is a $CH_3$—O— group if the ether is aliphatic and having no aryl group attached to the ether oxygen atom.

8. Method of effecting the addition of an alkali metal to phenanthrene which comprises bringing the alkali metal and the phenanthrene together in a reaction medium comprising effective amounts of a mono-ether inert to the alkali metal and the phenanthrene-alkali metal compound under the conditions of the reaction, said ether having an oxygen to carbon ratio of not less than 1:4 and in which there is a $CH_3$—O— group if the ether is aliphatic and having no aryl group attached to the ether oxygen atom.

9. Method of preparing the sodium salt of poly-carboxylic compounds from aromatic hydrocarbons which will form addition compounds with alkali metals, which comprises bringing the alkali metal and the hydrocarbon together in a reaction medium comprising effective amounts of an ether inert to the alkali metal and the hydrocarbon-alkali metal compound under the conditions of the reaction, said ether having an oxygen to carbon ratio of not less than 1:4 and in which there is a $CH_3$—O— group if the ether is aliphatic and having no aryl group attached to the ether oxygen atom if the ether is a mono-ether, and, after the alkali metal-hydrocarbon reaction has started, adding $CO_2$ to the solution so as to simultaneously carboxylate the alkali metal compound and form further amounts of alkali metal compound.

10. A method of preparing the sodium salt of poly-carboxylic compounds from aromatic hydrocarbons which will form addition compounds with alkali metals which comprises reacting the alkali metal and the aromatic hydrocarbon in a reaction medium comprising effective amounts of an aliphatic ether having a $CH_3O$ group and an oxygen to carbon ratio of not less than 1:4, which is inert to the alkali metal and the hydrocarbon-alkali metal compound under conditions of the reaction, and then, after the alkali metal-hydrocarbon reaction is started, adding carbon dioxide to the solution so as simultaneously to carboxylate the alkali metal compound and form further amounts of alkali metal compound.

11. Method of preparing the sodium salt of poly-carboxylic compounds from aromatic hydrocarbons which will form addition compounds with alkali metals, which comprises bringing the alkali metal and the aromatic hydrocarbon together in a reaction medium comprising effective amounts of a cyclic ether inert to alkali metal and the hydrocarbon-alkali metal compound under the conditions of the reaction, and, after the alkali metal-hydrocarbon reaction has started, adding $CO_2$ to the solution so as to simultaneously carboxylate the alkali metal compound and form further amounts of alkali metal compound.

12. Method of effecting the addition of an alkali metal to phenanthrene which comprises bringing the alkali metal and the phenanthrene together in a reaction medium comprising effective amounts of an ether selected from the group consisting of dimethyl ether, methyl ethyl ether, methyl normal propyl ether, methyl isopropyl ether, methylal, glycol dimethyl ether, glycol formal, dioxan, glycerol trimethyl ether, dimethylene pentaerythrite and glycerol mono formal methyl ether.

13. Method of effecting the addition of an alkali metal to diphenyl which comprises bringing the alkali metal and the diphenyl together in a reaction medium comprising effective amounts of an ether selected from the group consisting of dimethyl ether, methyl ethyl ether, methyl normal propyl ether, methyl isopropyl ether, methylal, glycol dimethyl ether, glycol formal, dioxan, glycerol trimethyl ether, dimethylene pentaerythrite and glycerol mono formal methyl ether.

14. Dihydrophenanthrene dicarboxylic acid prepared by a process comprising reacting phenanthrene with an alkali metal in an ether solution to form a di-alkali metal addition compound and reacting said addition compound with carbon dioxide.

NORMAN D. SCOTT.